United States Patent [19]
Griffioen et al.

[11] Patent Number: 5,639,183
[45] Date of Patent: Jun. 17, 1997

[54] INSTALLING CABLE-DUCTS

[75] Inventors: Willem Griffioen, Ter Aar; Cornelis Casparus Van Bijsterveld, Voorschoten; Hubertus Augustinus Leonardus Maria De Graaf, Leiden, all of Netherlands

[73] Assignee: Koninklijke PTT Nederland N.V., Groningen, Netherlands

[21] Appl. No.: 551,158

[22] Filed: Oct. 31, 1995

[30] Foreign Application Priority Data

Nov. 4, 1994 [NL] Netherlands ............. 9401838

[51] Int. Cl.$^6$ .................... F16L 1/00; F16L 55/00
[52] U.S. Cl. ............. 405/154; 405/184; 254/134
[58] Field of Search .................. 405/154, 184, 405/156, 157; 138/98; 254/134.3 R, 134.3 PT, 134.25 C

[56] References Cited

U.S. PATENT DOCUMENTS

| | | | |
|---|---|---|---|
| 4,067,200 | 1/1978 | Watts, Jr. et al. | 405/184 |
| 4,519,462 | 5/1985 | Kelley . | |
| 4,850,569 | 7/1989 | Griffioen et al. . | |
| 4,871,034 | 10/1989 | Schmidt | 405/154 X |
| 4,934,662 | 6/1990 | Griffioen et al. . | |
| 5,096,000 | 3/1992 | Hesse . | |
| 5,174,684 | 12/1992 | Keener et al. | 405/154 |
| 5,302,053 | 4/1994 | Moriarty | 405/154 |
| 5,544,977 | 8/1996 | Cravy et al. | 405/154 |

FOREIGN PATENT DOCUMENTS

| | | |
|---|---|---|
| 0292037 | 11/1988 | European Pat. Off. . |
| 33 31 291 A1 | 3/1984 | Germany . |
| 38 26 513 A1 | 2/1990 | Germany . |
| 2 085 670 | 4/1982 | United Kingdom . |
| 2 103 888 | 2/1983 | United Kingdom . |

OTHER PUBLICATIONS

Terrabor 2001—A Directional Drilling System pamphlet.

*Primary Examiner*—Tamara L. Graysay
*Assistant Examiner*—Frederick L. Lagman
*Attorney, Agent, or Firm*—Frishauf, Holtz, Goodman, Langer & Chick

[57] ABSTRACT

A method for installing a tubular cable-duct around a cable buried in the ground includes steps of freeing a portion of the buried cable from the ground in a forward longitudinal direction of the cable, starting from a free end of the buried cable, and advancing a foremost end of the cable-duct and subsequent portions of the cable-duct in the forward longitudinal direction of the cable over the portion of the cable freed from ground, starting from the free end of the cable. The advancing step includes the sub-steps of exerting pulling forces on the cable with a pulling device engaging the free end of the buried cable in a direction which is substantially opposed to the forward longitudinal direction of the cable, and exerting pushing forces with a pushing device engaging the cable-duct in a direction which is substantially opposed to the direction in which the pulling forces are exerted. An apparatus for installing the tubular cable-duct around a cable buried in the ground includes a winch provided with a winching wire having a coupling unit for providing a tension-proof coupling to a free end of the buried cable, a clamp which clamps an end of the cable-duct, a feed-unit which is coupleable to the end of the cable-duct for feeding a fluid to the cable-duct, and a displaceable support on which the winch, the clamp and the feed-unit are arranged in a mutually fixed position with respect to one another.

20 Claims, 5 Drawing Sheets

INSTALLING CABLE-DUCTS

BACKGROUND OF THE INVENTION

1. Field of the Invention

The invention is in the field of providing cable-ducts in the ground. More particularly, it relates to a method and a device for installing a cable-duct around a cable buried in the ground. It furthermore relates to a method for installing a cable-duct in the ground by making use of a cable buried in the ground.

2. Prior Art

At present, a transition is taking place in telecommunication networks from electrical signal transmission to optical signal transmission on an ever greater scale. In this transition, electrical cables, in this case copper cables, are being replaced by optical fibre cables. In contrast to copper cables, optical fibre cables are installed in the ground not directly, but in special cable-ducts, usually in the form of plastics tubes, inter alia, because of their greater vulnerability and greater weld-free lengths. If a copper cable has to be replaced by an optical fibre cable, the copper cable can be dug up and replaced by such a plastics tubular cable-duct into which the optical fibre cable is later introduced and installed. Since the digging of trenches in the ground is expensive and time-consuming, trench-free installation techniques are also used, depending on the circumstances.

Various trench-free installation techniques are known for installing such cable-ducts in the ground. Thus, for example, reference the TERRABOR® 2001 Directional Drilling System (Craelius, E 110388) is a technique for drilling with the aid of a drilling head mounted on the foremost end of a drilling rod which is formed by a number of coupled, hollow tubular drilling-rod sections. In this technique, the drilling head is pushed, optionally together with the drilling rod into the ground, while rotating, and at the same time a drilling liquid is forced through the hollow drilling rod and the drilling head. During the progress of the drilling, new drilling-rod sections are continually coupled on at the rear. During this operation, the drilling head is tracked from above the ground radiographically and is guided via the drilling rod. Once the drilling rod has reached a desired aboveground end point, a cable-duct to be installed is attached, in the end point, to the foremost end of the drilling rod. The drilling rod is then withdrawn from the drilled hole, and the cable-duct is pulled into the drilled hole, optionally preceded by a reamer. Such a guided drilling technique has the advantage that the existing infrastructure, such as waterways, motorways and railways, do not have to be disturbed. This known technique does, however, have a number of disadvantages. It is fairly expensive, inter alia because of the navigation system required for the drilling head. In urban areas, moreover, there is an increased risk of damage to existing water lines, gas lines, electricity lines and other lines, inter alia because of the limited accuracy of the navigation. Still further the drilling rods require a certain stiffness which appreciably limits the sharpness of bends in the drilling route. In addition, in the event of replacement, discarded copper cables remain behind in the ground, and this is undesirable, inter alia, for environmental considerations.

DE-A-3331291, GB-A-2103888 and GB-A-02085670 disclose a technique for replacing ground cables, in which a specific digging apparatus is used which advances around the ground cable in the axial direction under hydraulic drive and which can loosen and flush away the ground around the cable to be replaced, after which the cable can easily be pulled out of the ground. The apparatus is provided with special nozzles for a flushing liquid which is fed through a liquid line which the apparatus carries along parallel to the cable as it advances. Parallel thereto, the apparatus also carries along two feedlines for feeding an hydraulic liquid for the hydraulic drive. During the extraction, the replacement cable is pulled into the ground at the end of the cable to be replaced. This known technique can be used for installing cable-ducts if a cable-duct is pulled in place of a cable. Advantages of such a method of installing cable-ducts in the ground are that a navigation system can be dispensed with, that the risk of damage to other lines in the ground is minimal, and that the cable to be replaced does not remain unused in the ground as an interfering object and can also be recycled. A disadvantage is, however, that the lines carried along by the apparatus have to be pulled through the drilled hole over the entire length in an unprotected manner, and must be removed after loosening the cable in the ground prior to, or at the same time as, the withdrawal of the cable. Under these circumstances, there is an additional risk that the drilled hole formed around the loosened cable is affected, in particular if the drilled hole is rather tortuous.

DE-A-3331291 discloses a technique for laying ducts in the ground in a trench-free manner, in which a tube is slid into the ground over an existing cable. This technique uses a so-called ramboring apparatus which is pneumatically driven to advance coaxially over the cable, with the ground around the cable being pushed aside. While advancing, the apparatus pulls a tube connected to it, which slides along over the cable freed from ground. Through the tube, feedlines for compressed air and possibly a lubricant are also conveyed. The pneumatic drive occurs by means of piston-cylinders mounted in the apparatus which carry out an oscillating strike movement under compressed air drive, as a result of which the apparatus slides forward over the cable jerkily. With such a technique, a cable-duct can basically be installed into the ground without excavation, after having installed a tubular cable-duct around an old cable, by removing said cable thereout after which the cable-duct is ready for inserting a new cable. This technique also has the advantages that no navigation system is needed, that the risks of damage to other cables in the ground is minimal, and that the old cable can be removed in a simple manner. An additional advantage is that the feedlines carried along are situated in a protected manner in the tube drawn by the apparatus. However, the technique has a number of limitations. The pulling forces exerted by the ram-boring apparatus on the foremost end of the tube can soon be insufficient to be able to slide a tube, steadily increasing in length, along over the cable through the drilled hole in the ground, especially if said cable is quite tortuously situated in the ground. Moreover, the use of a pneumatically driven ramboring apparatus is not always suitable. The apparatus for example may not operate well, or may not operate at all, in soft ground, and vibrations can occur in hard ground due to the pneumatic strikes. Such vibrations can be harmful to possible buildings in the surrounding area. Furthermore, carrying along the feedlines requires a relatively large inner diameter for the tube with respect to that of the cable. Finally, the means for scraping dirt, which means are provided at the front of the apparatus, can impede the advance of the tube.

SUMMARY OF THE INVENTION

The object of the invention is to provide a method and device for installing a cable-duct in the ground having all of the advantages but none of the disadvantages of the known techniques discussed above.

The invention relates to a method and a device whereby, as in DE-A-3826513, a cable-duct is slid over a cable buried in the ground. However, unlike as in DE-A-3826513 instead of exerting pulling forces on a foremost end of the cable-duct, the cable-duct is slid over the cable by exerting pushing forces on the cable-duct.

A method for installing a tube-like cable-duct around a cable buried in the ground, according to the present invention comprises the following steps:

freeing the ground around the cable in a forwards longitudinal direction, starting from a free end of the buried cable, and advancing, over the part of the cable freed from the ground, a foremost end of the cable-duct and subsequent parts of the cable-duct in said forwards longitudinal direction, starting from the free end, wherein the step of advancing the cable-duct over the part of the cable freed from ground comprises the following sub-steps:

exerting pulling forces on the cable with the help of pulling means engaging on the free end of the buried cable in a direction which is substantially opposed to said forwards direction, and exerting pushing forces, with the help of pushing means, which forces engage on the cable-duct in a direction which is substantially opposed to the direction in which the pulling forces are exerted.

In a preferred embodiment of the method in accordance with the invention, the pulling means comprises winching means provided with a winching wire which is supplied by the tubular cable-duct, to be installed, via a rearmost end thereof, and coupled to the free end of the buried cable.

In a further preferred embodiment of the method in accordance with the invention, the pushing forces are generated by bracing the rearmost end of the cable-duct against bracing means which, together with the winching means, are arranged in a mutually fixed position on support means which are displaceable in said forwards longitudinal direction, while at the same time tautening and winding up the winching wire with the winching means. This is very advantageous as no further driving means are needed other than those for the winching means.

Further preferred embodiments are directed at installing the cable-duct in one piece, and at a cable-duct comprising duct segments which can be coupled.

In a still further preferred embodiment, use is made of the fact that a tubular cable-duct, which can be slid fairly easily over a cable, must have an inner diameter which is larger than the outer diameter of the cable to such an extent that through the space, between an inner wall of the duct and the cable, a liquid can be pressed into the direction in which the cable-duct is slid along over the cable in order to serve as a drilling liquid. Preferably a spouting member is used, which encompasses the cable and is displaceable in the longitudinal direction thereof, which member is coupled to the foremost end of the cable-duct, with the liquid being led into the direction of and through the spouting member to a front of the spouting member.

In yet a still further preferred embodiments of the method, the step of freeing the ground around the cable is performed by a pneumatically or hydraulically driven freeing means, such as the above-mentioned digging and ram-boring apparatus, which are coupled to the foremost end of the cable-duct, and with feedlines for driving such freeing means being carried along parallelly to the cable in the cable-duct. This preferred embodiment has the great advantage that simultaneously with exerting pushing forces on the cable-duct, pulling forces on the foremost end of the cable-duct are exerted, which forces support said pushing forces. Thus, much larger installation lengths for the cable-duct can be attained, than with only exerting pushing or pulling forces.

Thus, a device for installing a tubular cable-duct around a cable buried in the ground, in accordance with the invention comprises:

winching means provided with a winching wire having first coupling means for a tension-proof coupling to a free end of the buried cable, clamping means for clamping an end of a cable-duct, a feed-unit which can be connected to an end of a cable-duct for feeding a liquid to a cable-duct connected to the feed-unit, and displaceable support means on which the winching means, the clamping means and the feed-unit are arranged in a mutually fixed position with respect to one another.

Other preferred embodiments of the invention are described hereinbelow.

The publications cited hereinabove are deemed to be incorporated in the present application.

BRIEF DESCRIPTION OF THE DRAWINGS

The invention will be explained by reference to the following figures.

DETAILED DESCRIPTION

Figure 1:
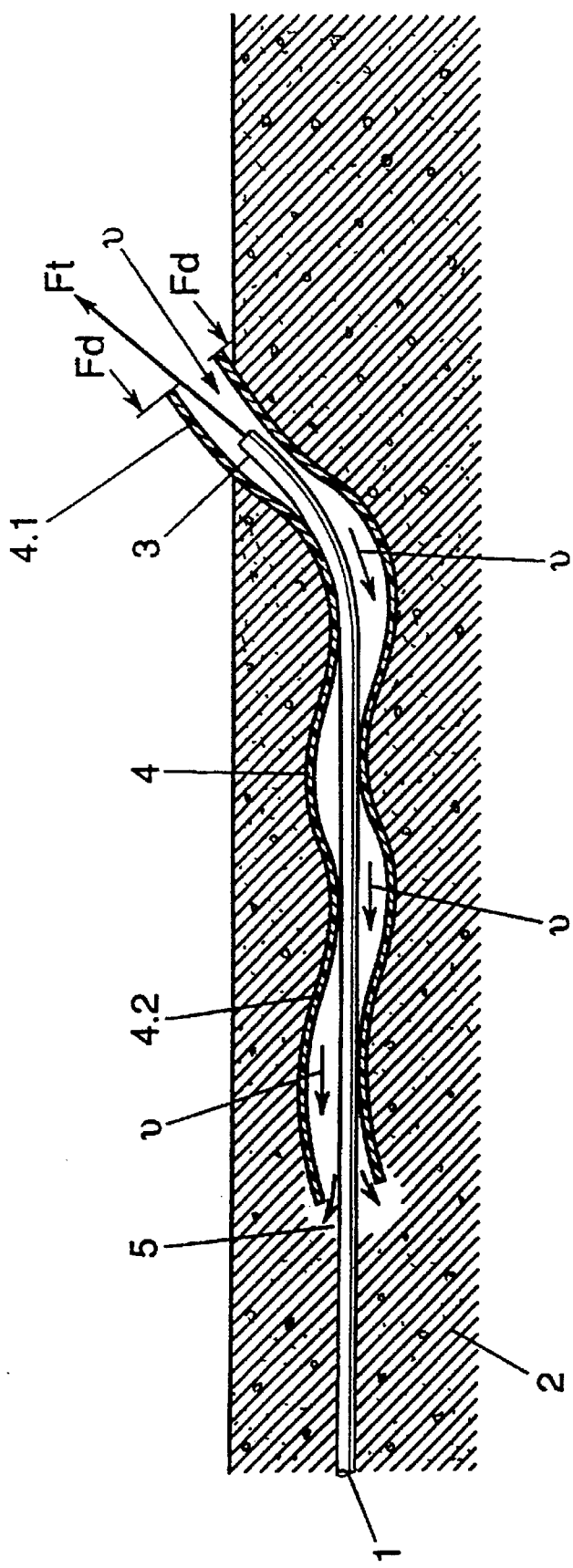
FIG. 1 shows diagrammatically a longitudinal section through a cable buried in the ground over which a cable-duct has been slid over a certain length by the method of the invention.

An embodiment of a method and device for installing a tubular cable-duct around a cable buried in the ground in accordance with the invention is described below. The essential features thereof are first explained by reference to FIG. 1. FIG. 1 shows diagrammatically a longitudinal section through a cable 1 buried in the ground 2. A tubular cable-duct 4, (hereinafter alternatively referred to as a "duct") which is fed above-ground has been slid over a dug-up, freed end 3 of the cable over a certain length. In order to slide the duct further over the cable in the ground starting from this situation, a pulling force $F_t$ (see arrow $F_t$) is exerted on the freed end 3 in the duct 4 and pushing forces $F_d$ (see arrows $F_d$) are exerted on an aboveground end 4.1 of the duct 4 in a direction essentially opposite to the direction of the pulling force $F_t$. This implies, in fact, that the cable is tautened throughout the duct at its end 3. Simultaneously with the exertion of the pulling and pushing forces, a liquid (arrows v) is pumped into the duct 4 under pressure via the aboveground end 4.1 of the duct in the direction of a foremost end 4.2 of the duct. Said liquid flows out of the duct at the foremost end 4.2 of the duct and penetrates and softens the ground locally around the cable, and at least partially flushes it away, as a result of which a space 5 is produced around the foremost end 4.2, which space 5 is more easily penetrable for the foremost end of the duct than the unsoftened ground. In the space 5, the foremost end 4.2 of the duct 4 is slid further as a consequence of the resultant of the pulling and pushing forces mentioned.

It should be pointed out that the description "aboveground" of the end 4.1 of the cable-duct 4 is more generally understood as meaning that part of the duct not yet installed around the cable.

In order to be able to efficiently follow any bends in the cable while the cable is being slid forward, the duct must have a certain degree of flexibility. Tautening the cable throughout the duct prevents the duct and cable from upsetting or kinking in the case of such a flexible duct as a consequence of the exertion of the pushing forces, as a result of which the sliding forward would otherwise be made difficult or even blocked (or seized up).

Instead of using a pressurised liquid in order to create free space in which the foremost end of the cable-duct can be slid forwards, a ram-boring apparatus as disclosed in DE-A-3826513 can also be applied. Also digging apparatus such as disclosed in DE-A-3331291, GB-A-2103888 and GB-A-02085670 can be used after some modification, so that they can also carry along a cable-duct around the cable, and with the feedlines such as for hydraulic drive being guided through the cable-duct. Using such boring and digging means has the advantage that, simultaneously with the pushing forces exerted on the cable-duct and the pulling forces exerted on the cable, pulling forces are exerted on the foremost end of the cable-duct as well. As a result, the installing-length for a cable-duct can under circumstances be substantially enlarged. In the following however, exemplary embodiments are elaborated into further detail in which pressurised liquid is used with the duct itself being used as a feedline, so that it is not necessary to carry along additional feedlines through the cable-duct. Moreover, a relatively simple spouting member will suffice, which is displaceable around the cable and which is directly coupled to the foremost end of the cable-duct.

Figure 2:
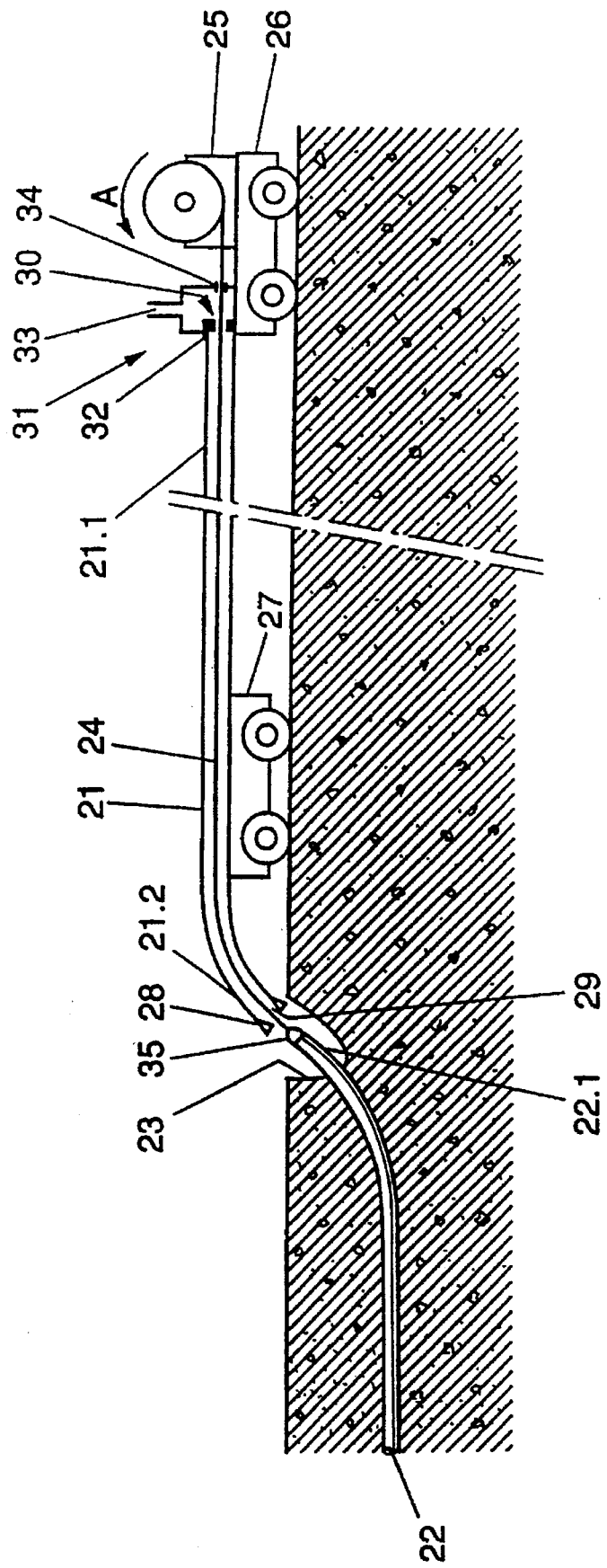
FIG. 2 shows diagrammatically the device in accordance with the invention at a first stage of performing the method.
Figure 3:
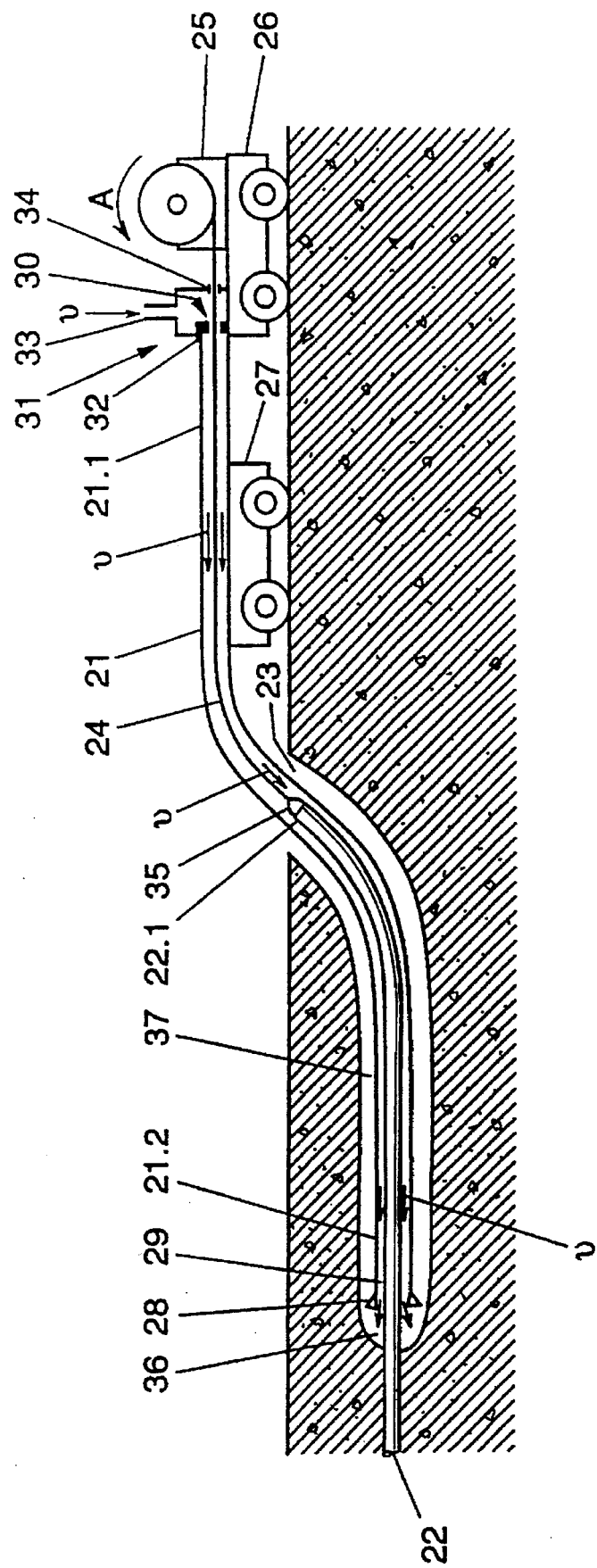
FIG. 3 shows diagrammatically the device in accordance with the invention in a second stage of performing the method.

FIG. 2 and FIG. 3 show diagrammatically a first stage and a second stage, respectively, of the performance of the method and an associated device with which a cable-duct 21 is slid over a cable 22 buried in the ground. To achieve the first stage, a cable end 22.1, hereinafter referred to as foremost end 22.1 of the cable, of the buried cable 22 is freed from the ground, for example by digging a pit 23 in the ground around said end. The other cable end (not shown), hereinafter also referred to as the rearmost end of the cable, is also dug up and fixed. Between the foremost and the rearmost end of the cable, the cable-duct has to be installed around the cable in the ground. A winching wire 24 is then fastened to the foremost end 22.1 by means of a tension-proof coupling 35. In doing so, the winching wire 24 is fed through the cable-duct 21 from a winch 25 permanently mounted on a mobile support platform 26. The cable-duct 21 is laid out over its length above-ground, for example on the ground, but preferably over one or more mobile duct guides 27. The length of the cable-duct laid out corresponds to the length of the cable in the ground between the foremost and rearmost cable ends which have been dug up. Mounted at the foremost end 21.2 of the cable-duct 21 is a spouting member 28. The spouting member has a passage opening 29 via which the winching wire 24 is brought out of the cable-duct.

The passage opening 29 of the spouting member 28 has a diameter which is somewhat larger than the diameter of the cable 22, so that the spouting member can easily be slid over the cable 22 with some play. A rearmost end 21.1 of the cable-duct 21 is coupled to an outlet channel 30 of a feed-unit 31 for feeding a liquid under pressure. The feed-unit 31 is also permanently mounted on the support platform 26. For the purpose of coupling an end of a cable-duct, the feed-unit 31 is provided around the outlet channel 30 with take-up means 32 in which the rearmost end 21.1 of the duct can be received in a clamped and liquid-tight manner. The feed-unit 31 is furthermore provided with an inlet channel 33 to which a feedline (not shown) for the liquid is connected, and with a passage opening 34, which is sealed for the liquid in a leak-free manner, for the winching wire 24. The passage opening 34 is positioned with respect to the outlet channel 30 in such a way that the winching wire 24 is introduced into the duct from the winch 25 through the feed-unit 31 in an essentially straight line via the passage opening 34 and via the outlet channel 30.

The mobile duct guide 27 is designed so that a cable-duct can slide along, in its longitudinal direction with some resistance, over the guide (i.e., so that if a cable-duct supported by the duct guides is pushed forward in its longitudinal direction, the duct guide travels with it unless its travel is blocked).

From the arrangement shown in FIG. 2, the winching wire 24 with the winch 25 is then first tautened and wound up over some length (in arrow direction A). As a result, owing to the fixed arrangement of the winch 25 with respect to the feed-unit 31, of the tension-proof coupling of the rearmost end 21.1 of the duct in the feed-unit 31 and of the mobility of the support platform 26, the foremost end 22.1 of the cable is pulled into the cable-duct 21 through the spouting member 28, or, in other words, the cable-duct is pushed in order to slide along over the winching wire and the foremost end of the cable with the take-up means 32, which receives and clamps the rearmost end 21.1 of the duct, functioning as a bracing device. The length over which the winching wire 24 is wound up in this process is, for example, such that the spouting member 28 collides with the ground in the pit 23. In order to achieve a supple guidance of the foremost end 22.1 of the cable into the passage opening of the spouting member while pulling in, the tension-proof coupling 35 of the winching wire 24 with the foremost end 22.1 of the cable is preferably provided with a conically extending guide piece for the transition between the diameters of the winching wire and the cable.

Another method of introducing the foremost end, coupled to the winching wire, of the cable into the foremost end of the cable-duct is as follows: first the spouting member 28 is slid around the foremost end 22.1 of the cable by hand. Then the winching wire 24 fed through the cable-duct 21 is coupled by means of the tension-proof coupling 35 to the foremost end 22.1 of the cable, tautened and wound up over a certain length so that the foremost end 21.2 of the cable-duct 21 is slid into the direction of, and over, the foremost end 22.1 of the cable. Thereafter, the spouting member 21 is mounted on the foremost end 21.2 of the cable-duct. The winching wire is then wound up a little further still, for example again until the spouting member collides with the ground in the pit 23.

After these preparations, a liquid pumping installation (not shown) is connected to the inlet channel 33 of the feed-unit by means of a feedline (also not shown) in order to feed liquid under pressure and is then set in operation. Under the pressure, the liquid is forced in the direction of the spouting member 28 via the inlet channel 33 and the outlet channel 30 of the feed-unit 31, through the cable-duct 21, first along the winching wire 24 and then along that part of the cable 22 already pulled into the cable-duct and forcibly spouted outwards through openings (see below for more detail) of the spouting member 28 from the cable-duct. The spouting liquid impregnates the ground outside the cable-duct with liquid and flushes it away. This forms a space 36 which is penetrable for the foremost end 21.2, provided with the spouting member 28, of the duct. The duct is slid forward over the cable and the foremost end 21.2 with the spouting member 28 is pushed into said penetrable space 36 by slowly winding up the winching wire 24 with the winch 25 in the mean time. As a result of continuously supplying fresh liquid, fresh penetrable space 36 in which the duct 21 is constantly slid further forward over the cable 22 in the direction of the rearmost end of the cable is constantly formed in the forward direction around the spouting member 28. In order to prevent the winch becoming too heavily loaded during winding up and in order to withstand the pushing forces on the rearmost end of the cable-duct, the travelling chassis of the support platform is preferably also driven by a motor. The travelling chassis may also be provided with a brake mechanism in order to slow down the forward movement of the support platform in the event of any upsetting or kinking of the aboveground part of the cable-duct. Around the duct which is slid forward there also arises a tubular cavity 37 in which the cable-duct 21 can easily slide forward and in which any excess liquid can flow back in the direction of the pit 23 originally dug and can be pumped out therefrom for reuse (not shown). This stage is shown in FIG. 3. If a mobile duct guide 27 approaches the pit 23 in the course of sliding forward, said duct guide 27 is removed from underneath the cable-duct 21. The sliding along of the cable-duct forward over the cable in the ground is continued until the spouting member 28 reaches the rearmost end of the cable which has been dug up. Then the liquid supply is stopped, the winding-up of the winching wire is discontinued and the winching wire is slackened. The rearmost end 22.1 of the duct is then uncoupled from the feed-unit 31 and the support platform 25 is removed some distance from the rearmost end 21.1 of the duct 21. Thereafter the winching wire 24 is uncoupled from the foremost end 22.1 of the cable. Because the support platform 26 cannot generally travel into the pit 23, the cable end 22.1 with the tension-proof coupling 35 of the winching wire 24 will still be situated in the cable-duct 21 at some distance from the rearmost end 21.1 of the cable-duct so that the tension-proof coupling 35 is not directly accessible to uncouple the winching wire 24. In that case, a piece of the cable-duct of suitable length can be sawn off. Use can also be made of an auxiliary tube of suitable length which can be coupled to, and decoupled from, the rearmost end 21.1 of the cable-duct and with which the cable-duct is temporarily lengthened so that, after said auxiliary tube has been uncoupled, the tension-proof coupling 35 is directly accessible. Conversely, the winching wire can be lengthened in a corresponding way by means of an auxiliary piece which can be uncoupled.

When the cable-duct has been installed in such a way around the cable in the ground, the cable may optionally be removed from the duct at one of the two ends, for example by pulling. After the rearmost end (not shown) of the cable has been released, the cable may also be pulled out directly using the winching wire, that is to say without releasing it from the foremost end of the cable, by winding the winch up further and winding the cable onto the drum of the winch. It goes without saying that the drum of the winch must have suitable dimensions for this purpose. The feed-unit 31 is preferably divisible in such a way that it can be removed from the winching wire.

Water, for example, can be used as liquid. A drilling liquid often used in ground borings and composed of water to which bentonite has been added can also be used. Such a drilling liquid has the advantage that the wall of the tubular cavity 37 around the duct 21 in the ground is reinforced, as a result of which the risk of collapse, which would make it difficult to push forward, is reduced.

Figure 4:
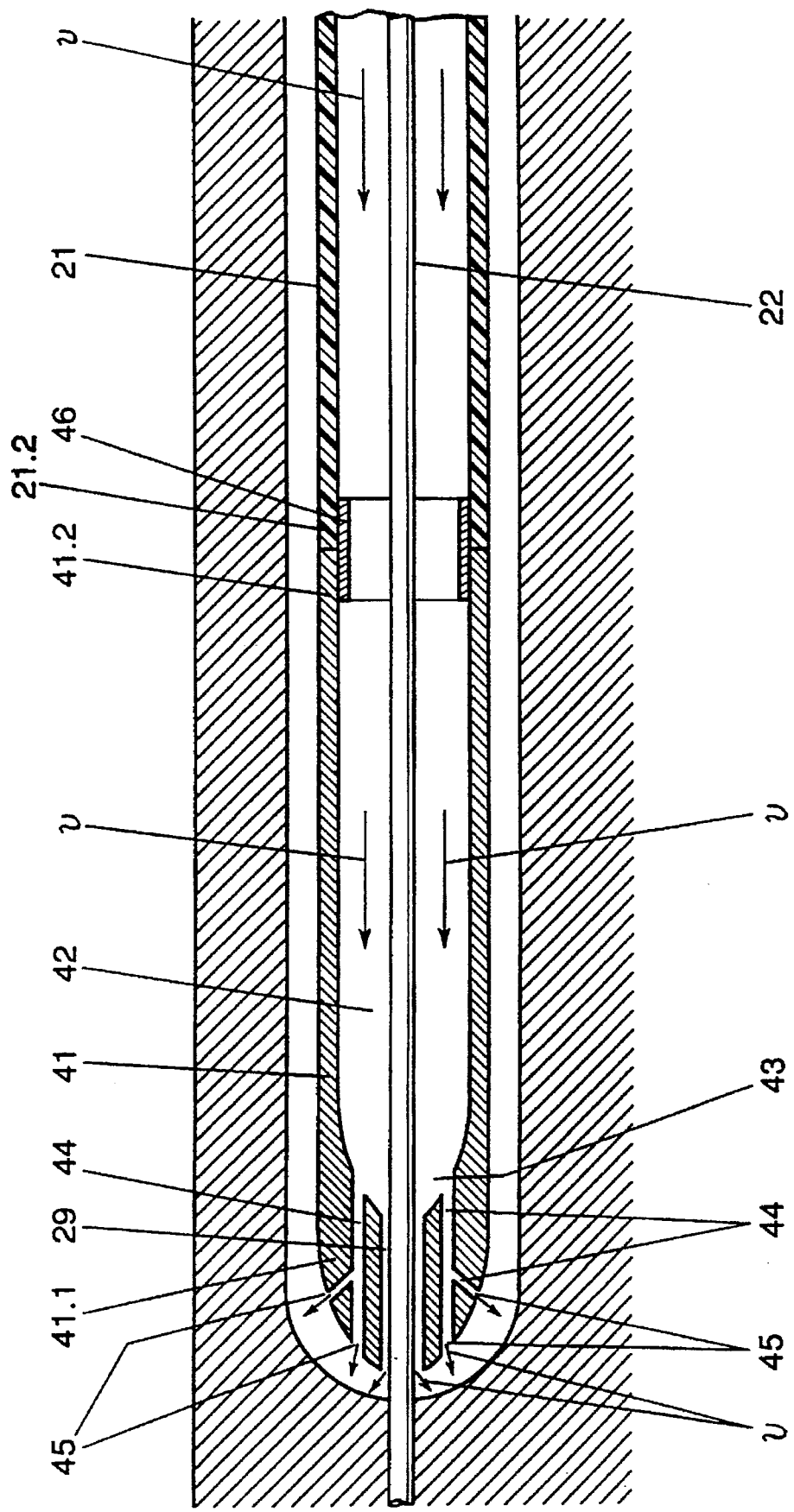
FIG. 4 shows diagrammatically a spouting member in accordance with the invention during performance of the method at the stage shown in FIG. 3.

FIG. 4 shows a longitudinal section of an embodiment of the spouting member 28 during operation (see the stage shown in FIG. 3) in greater detail. This embodiment has an essentially cylindrical hollow housing 41 provided with a rounded (streamlined) front part 41.1 and an open tail part 41.2. The housing 41 at least partly encloses a cavity 42 between the front part 41.1 and the open tail part 41.2. The front part 41.1 is provided with a cable passage opening 43 which is coaxial with the cylindrical axis of the housing 41. Furthermore, the housing is provided with a number of liquid channels 44 which lead outwards through the thickened front part from the cavity 42 enclosed by the housing and which ends in nozzles 45 at the outside of the front part. The nozzles are preferably provided in concentric rows over the outside of the front part, the number of nozzles being matched to a desired spouting density over a desired spouting surface area. The cable passage opening 43 has a diameter which is somewhat greater than the cable diameter. The open tail part 41.2 is provided with a coupling means which, only by way of example, is constructed as an inner sleeve 46 which is mounted coaxially in the tail part 41.2 and which partly projects outwards from the tail part and on which the foremost end 21.2 of the cable-duct 21 is coaxially mounted, for example by means of a screw coupling (not shown). The cylindrical housing has an external diameter which is essentially equal to the external diameter of the foremost end 21.2 of a cable-duct 21 coupled or to be coupled to the tail part 41.2 of the housing. During operation, the liquid v fed under pressure through the duct 21 along the cable 22 flows out of the foremost end 21.2 of the duct, through the inner sleeve 46 into the cavity 42 and is forced outwards and spouted via the liquid channels 44 through the nozzles 45 and along the cable through the cable passage opening 43. The liquid v forced and spouted outwards softens and flushes away the ground with liquid at the outside of the front part of the spouting member, free space 36 thereby being formed. In addition, when it slides the spouting member in through the cable passage opening 43, the cable is flushed clean by the liquid flowing past it.

The liquid pumping installation can also be placed on the support platform 26. In order, if necessary, not to load the winch too heavily, the liquid pumping installation is preferably arranged separately, optionally travelling concomitantly during operation. This is the case, in particular, if the liquid is a drilling liquid having a specific composition which has to be fed from a separate reservoir.

To perform the method, it is not necessary for the feed-unit and the winch to be placed in a mutually fixed arrangement on one and the same mobile support. They may also be arranged in positions which are mutually separate, but the feed-unit must always be arranged in a mobile manner. The pushing forces $F_d$ required during operation on the rearmost end of the cable-duct may be exerted, for example, by using a support platform whose travelling undercarriage is driven by a motor. This is not, however, necessary. The pushing forces can be exerted on any points on the entire aboveground end of the duct. In this arrangement, the winching wire can be fixed over a suitable length, or even replaced by a wire having a fixed length, whose one end is coupled to the foremost end of the cable and whose other end is anchored in the earth above-ground.

In order to feed the winching wire 24 through the cable-duct, the cable-duct is provided, for example when it is laid out in its length, with a traction wire (for example with the aid of a traction plug powered with compressed air) with which the winching wire is then pulled in.

The spouting member can also be embodied in rotating form. For this purpose, the spouting member is provided with a rotary coupling to the foremost end of the cable-duct and the nozzles in the front part of the spouting member have an orientation which is such that the liquid flowing out under pressure makes the spouting member rotate around its cylindrical axis. In order to increase the reaming action of such a rotating spouting member further, the outside of the front part is also provided with cutting knives. The spouting member can also preferably be divisibly assembled and disassembled lengthwise around and from the cable, respectively. This facilitates the mounting of the spouting member around the cable and makes it possible to remove the spouting member even in the case where the duct does not need to be installed over the entire cable.

Another method of rotating the spouting member is to make the duct rotate in its entirety over its length by driving the aboveground part of the duct in a rotating manner.

Figure 5:
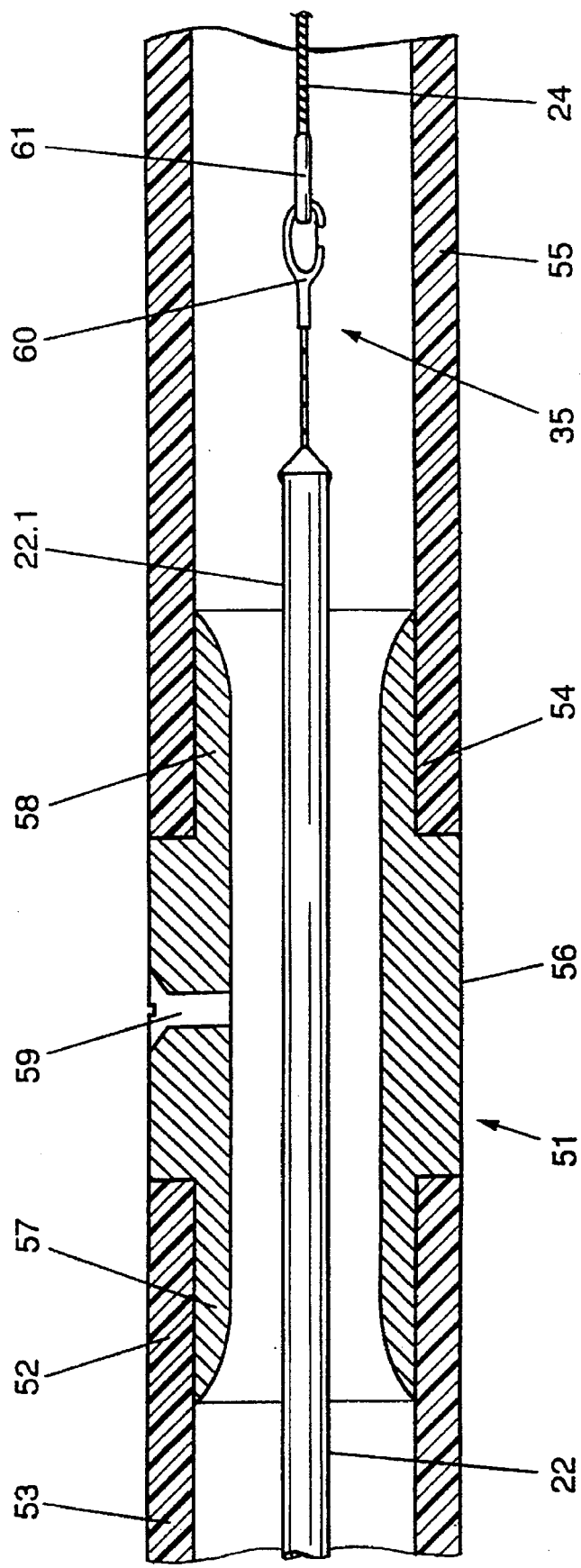
FIG. 5 shows diagrammatically a longitudinal section through a coupling piece with which two cable-duct segments are coupled to one another in a third stage of performing the method.

In the above, an embodiment of the method has been described in which the cable-duct to be installed is laid out over its full length and then installed over the cable in the ground in one 'sliding movement'. This is not, however, necessary. The cable-duct can also be installed in segments, successive cable-duct segments, or duct segments for short, for example 50 m long, being coupled in line with one another in a liquid-tight manner and slid over the cable in the ground. FIG. 5 shows a longitudinal section of a coupling piece 51 which connects a rearmost end 52 of a first duct segment 53 to a foremost end 54 of a second, subsequent duct segment 55. The coupling piece 51 is tubular with a centre part 56 having an external diameter essentially equal to the external diameter of the duct segments and, on either side of the centre part 56, narrower spurs 57 and 58 to which the ends 52 and 54, respectively, of the duct segments 53 and 55 are coupled in a liquid-tight manner, for example by means of a screw coupling. A venting nipple 59 is installed in the centre part 56 of the coupling piece 51. The internal diameter of the tubular coupling piece 51 is so much greater than the cable diameter that the liquid flow along the cable in a cable-duct formed from such coupled duct segments is not impeded during operation.

The auxiliary tube described above which can be coupled and decoupled and has a specific length and which is coupled in line with the rearmost end of the cable-duct in order to make direct access to the tension-proof coupling 35 of the winching wire 24 possible after decoupling is preferably coupled with the aid of the same coupling piece 51.

The segmented installing of the cable-duct proceeds as follows. A first duct segment 53 extended by means of a coupling piece 51 using a second duct segment 55 of specific length as auxiliary tube is slid over the cable 22 in the ground in a manner as described by reference to FIG. 2 and FIG. 3 until the coupling piece 51 has passed the foremost end 22.1 of the cable. The liquid supply is then stopped and the winding-up of the winching wire 24 is discontinued. FIG. 5 shows this instant during operation. At this time, the tension-proof coupling 35 which, only by way of example, is constructed as a hook 60 attached to the foremost end 22.1 of the cable and an eyelet 61 attached to an end of the winching wire 24 is situated in the second duct segment 55 used as auxiliary tube. The winching wire 24 is then slackened, the rearmost end of the second segment 55 used as auxiliary tube is decoupled from the feed-unit 31 and the foremost end 54 of the second segment is uncoupled from the coupling piece 51. The second segment 55 is then slid back over the slackened winching wire 24 and the winching wire is released at the tension-proof coupling 35 from the foremost end 22.1 of the cable. One of the ends of a third duct segment is then coupled by means of a new coupling piece 51 to the foremost end 54 of the second duct segment 55 used as auxiliary tube and the winching wire 24 is fed through the second and the third duct segment and coupled by means of the tension-proof coupling 35 to the foremost end 22.1 of the cable. Thereafter, the other end of the third duct segment on the original coupling piece 51 is coupled to the rearmost end 52 of the first duct segment 53, the rearmost end of the second segment used as auxiliary tube is again coupled to the feed-unit 31, and the winching wire 24 is again tautened. This instant during operation is also shown in FIG. 5, with the proviso that 55 now indicates the third duct segment and 54 its foremost end. Now the liquid supply is continued again, the venting nipple 59 of one or two coupling pieces 51 at the ends of the third duct segment also being opened; and the winching wire 24 is again wound up slowly. This instant during operation corresponds to that shown in FIG. 3, with the proviso that the duct 21 is now made up of three duct segments. Every subsequent duct segment is added in a similar way between a preceding duct segment already installed around the cable in the ground and the second duct segment used as auxiliary tube until the spouting member 28 on the foremost end 21.2 of the cable-duct, in this case of the first duct segment 53, reaches the rearmost end of the buried cable.

What is claimed is:

1. A method for installing a tubular cable-duct around a cable buried in the ground, said method comprising the steps of:

freeing a portion of the buried cable from the ground in a forward longitudinal direction of the cable, starting from a free end of the buried cable; and advancing a foremost end of the cable-duct and subsequent portions of the cable-duct in the forward longitudinal direction of the cable over the portion of the cable freed from ground, starting from the free end of the cable; and wherein the step of advancing the cable-duct over the portion of the cable freed from the ground comprises the following sub-steps:

exerting pulling forces on the cable with a pulling device engaging on the free end of the buried cable in a direction which is substantially opposed to the forward longitudinal direction of the cable; and exerting pushing forces with a pushing device engaging on the cable-duct in a direction which is substantially opposed to the direction in which the pulling forces are exerted.

2. The method of claim 1, wherein the sub-step of exerting pulling forces comprises providing a winch as the pulling device, said winch having a winching wire which is supplied by the tubular cable-duct to be installed via a rearmost end of the cable duct and which is coupled to the free end of the buried cable.

3. The method of claim 2, wherein the sub-step of exerting pushing forces comprises bracing the rearmost end of the cable duct against a bracing device which, together with the winch, is arranged in a mutually fixed position on a support which is displaceable in said forward direction, while at the same time tautening and winding up the winching wire with the winch.

4. The method of claim 1, further comprising an initial step of laying out the cable-duct to be installed in its longitudinal direction, said laid out cable-duct being supported at least locally by a support which is displaceable in a forward longitudinal direction of the cable-duct.

5. The method of claim 1, wherein the cable-duct to be installed comprises tubular duct segments which can be mutually coupled, and further comprising the step of coupling a foremost end of every subsequent duct segment to a rearmost end of an immediately preceding duct segment after the immediately preceding duct segment has been slid forward over at least a portion of the cable in the ground.

6. The method of claim 1, wherein the step of freeing a portion of the buried cable from the ground comprises the sub-steps of:
feeding a fluid under pressure via a rearmost end of the cable-duct; and
flowing the fed fluid outwards at the foremost end of the cable-duct.

7. The method of claim 6, wherein the sub-step of feeding a fluid under pressure comprises feeding a liquid via the cable-duct as a feedline.

8. The method of claim 7, wherein the sub-step of feeding a fluid under pressure further comprises:
mounting a spouting member around the cable, said spouting member being displaceable in the longitudinal direction of the cable and being coupled to the foremost end of the cable-duct; and
leading the liquid into and through the spouting member to a front portion of the spouting member.

9. The method of claim 8, further comprising the step of removing the cable from the cable-duct after installation of the cable-duct.

10. The method of claim 7, wherein the sub-step of feeding a fluid under pressure comprises feeding a drilling liquid from a separate reservoir via the cable-duct as a feedline.

11. The method of claim 1, wherein the step of freeing a portion of the buried cable from the ground comprises the sub-steps of:
providing a freeing device which is displaceable around the cable in the longitudinal direction of the cable under pneumatic or hydraulic drive; and
coupling the freeing device to the foremost end of the cable-duct.

12. The method of claim 1, further comprising the step of removing the cable from the cable-duct after installation of the cable-duct.

13. A device for installing a tubular cable-duct around a cable buried in the ground, comprising:
a winch provided with a winching wire having a coupling unit for providing a tension-proof coupling to a free end of the buried cable;
a clamp which clamps an end of the cable-duct;
a feed-unit which is coupleable to the end of the cable-duct for feeding a fluid to the cable-duct; and
a displaceable support on which the winch, the clamp and the feed-unit are arranged in a mutually fixed position with respect to one another;
wherein the feed-unit comprises:
an inlet channel provided with a connector which connects a feedline for feeding a liquid under pressure;
an outlet channel provided with a coupling device which couples in a liquid-tight manner the end of the cable-duct to the outlet channel for discharging the liquid fed via the inlet channel into the end of the cable-duct coupled to the outlet channel; and
a passage opening for feeding the winching wire in a substantially leak-free manner from the winch through the feed-unit via the outlet channel up to and into the end of the cable-duct coupled to the outlet channel.

14. The device of claim 13, further comprising a spouting member, displaceable over the cable in a longitudinal direction of the cable, said spouting member including a coupling portion for providing a substantially liquid-tight coupling to a foremost installation end of the cable-duct.

15. The device of claim 14, wherein the spouting member comprises an essentially cylindrical hollow housing, said housing comprising:
a rounded front having a cable feedthrough channel, said cable feedthrough channel being coaxial with the cylindrical housing and being dimensioned to enable a cable to be fed therethrough with play;
a plurality of spouting openings in said rounded front through Which liquid can be spouted outwards from the housing; and
an open tail end provided with a coupling member which provides a substantially fluid-tight coaxial coupling to the foremost installation end of the cable-duct.

16. The device of claim 15, wherein said spouting member comprises two parts which can be coupled around the cable.

17. The device of claim 14, wherein:
said coupling portion of the spouting member rotatably couples the spouting member with respect to a foremost end of the cable-duct; and
the sprouting openings have an orientation such that a liquid spouting outwards through the spouting openings causes the spouting member to rotate during operation.

18. The device of claim 14, wherein said spouting member comprises two parts which can be coupled around the cable.

19. A device for installing a tubular cable-duct around a cable buried in the ground, comprising:
a winch provided with a winching wire having a coupling unit for providing a tension-proof coupling to a free end of the buried cable;
a clamp which clamps an end of the cable-duct;
a feed-unit which is coupleable to the end of the cable-duct for feeding a fluid to the cable-duct;
a displaceable support on which the winch, the clamp and the feed-unit are arranged in a mutually fixed position with respect to one another; and
a spouting member, displaceable over the cable in a longitudinal direction of the cable, said spouting member including a coupling portion for providing a substantially liquid-tight coupling to a foremost installation end of the cable-duct;
wherein the feed-unit comprises:
an inlet channel provided with a connector which connects a feedline for feeding a liquid under pressure;
an outlet channel provided with a coupling device which couples in a liquid-tight manner the end of the cable-duct to the outlet channel for discharging the liquid fed via the inlet channel into the end of the cable-duct coupled to the outlet channel; and a passage opening for feeding the winching wire in a substantially leak-free manner from the winch through the feed-unit via the outlet channel up to and into the end of the cable-duct coupled to the outlet channel; and wherein the spouting member comprises an essentially cylindrical hollow housing, said housing comprising:

a rounded front having a cable feedthrough channel, said cable feedthrough channel being coaxial with the cylindrical housing and being dimensioned to enable a cable to be fed therethrough with play;

a plurality of spouting openings in said rounded front through which liquid can be spouted outwards from the housing; and an open tail end provided with a coupling member which provides a substantially fluid-tight coaxial coupling to the foremost installation end of the cable-duct;

said coupling portion of the spouting member rotatably coupling the spouting member with respect to a foremost end of the cable-duct; and the spouting openings have an orientation such that a liquid spouting outwards through the spouting openings causes the spouting member to rotate during operation.

20. The device of claim 19, wherein said spouting member comprises two parts which can be coupled around the cable.

* * * * *